Sept. 16, 1924.

H. C. GILLETTE

COVER SEAL FOR STORAGE BATTERIES

Filed Nov. 8, 1921

1,508,847

Inventor:
Helen C Gillette,
by Byrnes Townsend & Brickenstein,
Attorneys.

Patented Sept. 16, 1924.

1,508,847

UNITED STATES PATENT OFFICE.

HELEN C. GILLETTE, OF ELMHURST, NEW YORK, ASSIGNOR TO THE PREST-O-LITE CO. INC., A CORPORATION OF NEW YORK.

COVER SEAL FOR STORAGE BATTERIES.

Application filed November 8, 1921. Serial No. 513,736.

*To all whom it may concern:*

Be it known that I, HELEN C. GILLETTE, a citizen of the United States, residing at Elmhurst, Long Island, in the county of Queens and State of New York, have invented certain new and useful Improvements in Cover Seals for Storage Batteries, of which the following is a specification.

This invention relates to the art of sealing storage batteries, and particularly to a more efficient seal for the joint between the cover and the jar of a storage battery.

Heretofore, sealing compound has been applied in a liquid state to the joint between the cover and the jar and since there is always more or less space between the jar and the cover, some of the heated liquid sealing compound flows through this space into the battery proper before the compound congeals. The principal object of this invention is to provide a sealing means which shall render it impossible for the sealing compound to flow into or pass the joint between the cover and jar.

Generally speaking, the invention consists in applying to the joint between the cover and the jar sealing compound that has congealed prior to its application to the joint, so as to form a foundation for the application of additional sealing compound at a higher temperature and in a liquid state to cover the congealed sealing compound and the adjoining parts of the jar and the cover.

Figure 1:
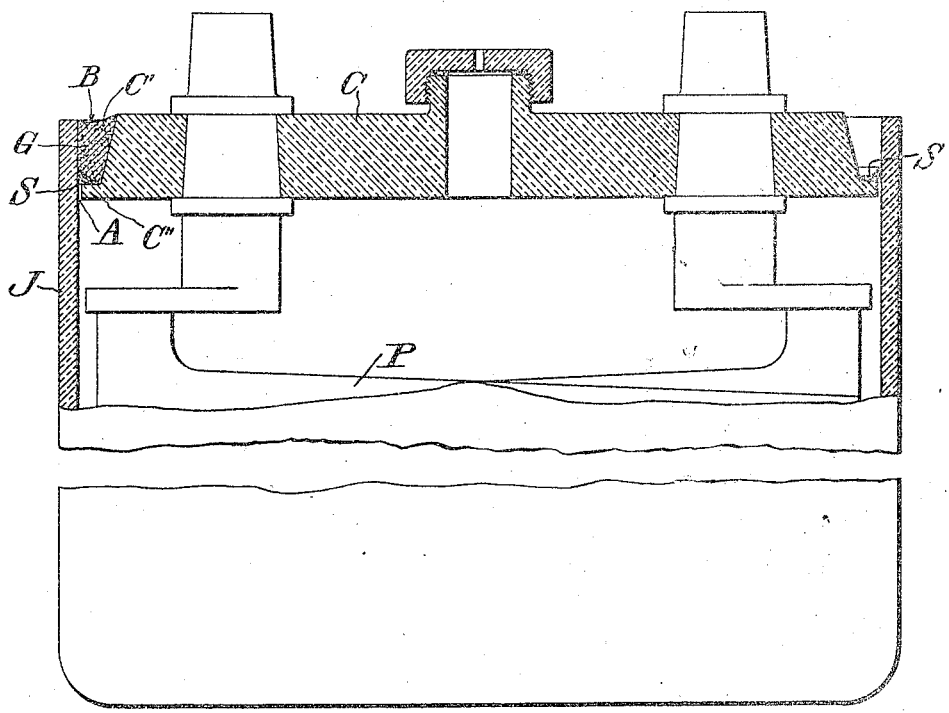
Figure 2:
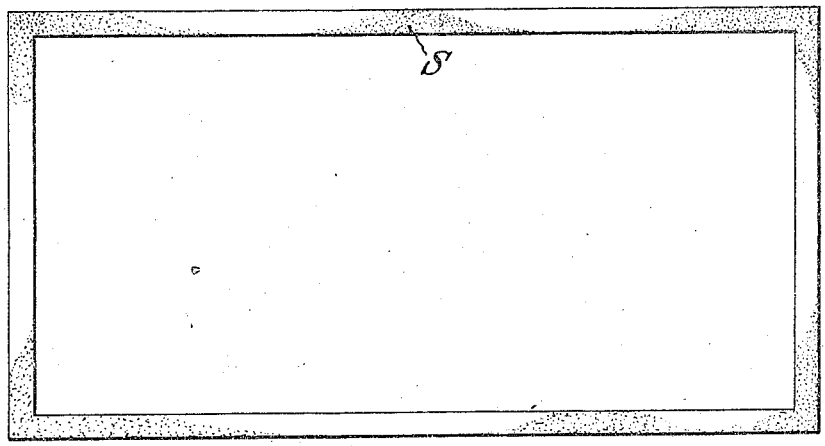

The above and other objects and the novel features of the invention will be apparent from the following description taken in connection with the accompanying drawings in which Figure 1 is a sectional view of a portion of a storage battery illustrating the application of my invention thereto, and Figure 2 is a plan view of one form of sealing strip employed in carrying out my invention.

Referring to Figure 1, J designates a cell jar of any usual or preferred construction adapted to contain the usual storage battery plates or elements P, electrolyte, and connecting members of the storage battery. The upper end of the jar is substantially closed by a cover C, both jar and cover being desirably of acid resisting and insulating material such as hard rubber. Within its margin the cover may have a downwardly and outwardly inclined surface C' terminating at the upper side of an outwardly projecting flange C'', whereby, when the cover is inserted into the jar, as shown, a groove G is formed to receive the means for sealing the joints between the cover and the jar.

Usually the cover does not fit tightly into the jar, a narrow space A being left at the joint which must be sealed to prevent the leakage of the electrolyte. Heretofore, the sealing compound, usually an asphaltic substance, has been applied in a molten liquid or plastic condition to the groove G, some of the compound flowing into the space A and through the latter into the compartment below. By applying suitable means to bridge the space A before the liquid sealing substance is introduced into the groove G, the leakage of such substance into the jar below the cover is avoided.

The joint at the space A is desirably bridged by a strip comprising sealing compound that has congealed prior to its application to said joint. As illustrated, for example, in Figures 1 and 2, a narrow strip S of material such as fabric may be saturated or coated with sealing compound in a liquid and heated condition, and allowed to cool to congeal said sealing compound. The strip S may then be applied to the joint between the jar and the cover to bridge the space A, as illustrated in Figure 1. Then additional sealing compound B heated to a higher temperature may be introduced as a liquid or plastic into the groove G to fill the latter and to cover the sealing strip S and the adjoining parts of the jar J and cover C. The additional seal B introduced in a heated and liquid state will unite with the sealing compound on the strip S and adhere to the adjoining surfaces of the jar A and cover C and thus provide a unitary liquid tight seal between the cover and the jar.

Other and equivalent means of applying a bridge of sealing compound at the joint between the jar and the cover may be employed, however, the fabric strips carrying congealed sealing compound are more satisfactory because they are easier to handle and hold the sealing compound together more securely. For some purposes it is satisfactory to extrude strips of congealed sealing compound onto the joint between the cover and the jar to form a bridge at the joint to prevent the additional liquid sealing compound of high temperature from flowing through the space between the cover and the jar. Strips of sealing compound may also be cast and congealed in molds to form the same to the shape of the jar to which they are to be applied, similar in general respects to the strip S shown in Figure 2. The cast congealed strips comprising sealing compound may be inserted into the groove G to bridge the joint between the cover and the jar, after which the additional sealing compound B may be applied. The pre-formed sealing strip thus provides a foundation for the major portion of the seal and permits the use of a sealing compound for such major portion that has a comparatively low melting point and is more resistant to temperature changes. It will be understood that the sealing compound of the sealing strips may be either of the same melting point or of a higher or lower melting point than that of the sealing compound B, as desired and determined by specific requirements.

The use and advantages of the improved sealing strips will be apparent from the foregoing description, and while the invention has been disclosed in detail, it will be understood that it is not to be limited to the exact forms shown and described.

I claim:—

1. Process of sealing covers in storage battery jars that comprises congealing asphaltic sealing compound in strip form, applying such congealed sealing strip across the joint between the cover and the jar of a storage battery, and then applying additional asphaltic sealing compound in a less congealed condition to unite with and cover said strip and the adjoining parts of the said jar and cover.

2. Process of sealing covers in storage battery jars that comprises coating a strip of fabric with sealing compound, applying such sealing strip across the joint between the cover and the jar of a storage battery, and applying additional sealing compound to unite with sealing compound on said strip and to cover adjoining surfaces of said jar and cover.

3. In a storage battery, the combination of a jar, a cover fitting into and substantially closing said jar, and means for sealing the joint between said cover and jar comprising congealed asphaltic sealing compound in strip form bridging the joint between said cover and jar, and additional asphaltic sealing compound united to the sealing compound comprising said strip and covering the same and adjoining parts of said jar and said cover.

4. In a storage battery, the combination of a jar, a cover fitting into and substantially closing said jar, and means for sealing the joint between said cover and jar comprising a fabric strip coated with congealed sealing compound bridging the joint between said cover and jar, and additional sealing compound united to such coating on said strip and covering the latter and adjoining parts of said jar and said cover.

5. In a storage battery, the combination of a jar, a cover fitting into said jar, and means for sealing the joint between said cover and said jar comprising sealing compound congealed prior to its application to said joint.

6. In a storage battery, the combination of a jar, a cover fitting into and substantially closing said jar, a strip bridging the joint between the cover and the jar comprising sealing compound congealed prior to its application to said joint, and additional sealing compound covering said strip and the adjoining portions of said jar and said cover, such sealing compounds having different melting points.

7. In a storage battery, the combination of a jar, a cover fitting into and substantially closing said jar, a strip coated with sealing compound bridging the joint between said cover and said jar, and sealing compound covering said strip and adjacent parts of said jar and said cover.

8. A sealing strip for bridging the joint between the cover and the jar of a storage battery comprising sealing compound congealed prior to the application of said strip to said joint.

9. Means for sealing covers in storage battery jars comprising a strip of fabric coated with sealing compound.

In testimony whereof, I affix my signature.

HELEN C. GILLETTE.